(12) United States Patent
Hanafi et al.

(10) Patent No.: US 11,238,737 B2
(45) Date of Patent: Feb. 1, 2022

(54) MOTOR VEHICLE COMPRISING A LIGHTING MODULE FOR GENERATING A SET OF SYMBOLS

(71) Applicant: Bayerische Motoren Werke Aktiengesellschaft, Munich (DE)

(72) Inventors: Abdelmalek Hanafi, Munich (DE); Lenja Sorokin, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/562,556

(22) Filed: Sep. 6, 2019

(65) Prior Publication Data

US 2019/0392711 A1    Dec. 26, 2019

Related U.S. Application Data

(63) Continuation of application No. PCT/EP2018/054128, filed on Feb. 20, 2018.

(30) Foreign Application Priority Data

Mar. 9, 2017    (DE) .................... 10 2017 203 899.3

(51) Int. Cl.
*G08G 1/16* (2006.01)
*B60Q 1/52* (2006.01)

(52) U.S. Cl.
CPC ............. *G08G 1/161* (2013.01); *B60Q 1/525* (2013.01); *G08G 1/166* (2013.01); *B60Q 2400/50* (2013.01)

(58) Field of Classification Search
CPC ........ B60Q 1/503; B60Q 1/525; B60Q 5/006; G08G 1/096791; G08G 1/163; G08G 1/166; G08G 1/22

See application file for complete search history.

(56) References Cited

U.S. PATENT DOCUMENTS

| | | | |
|---|---|---|---|
| 2006/0087416 A1 | 4/2006 | Kumabe et al. | |
| 2011/0140919 A1* | 6/2011 | Hara | G08G 1/163 340/907 |

(Continued)

FOREIGN PATENT DOCUMENTS

| | | |
|---|---|---|
| DE | 103 54 104 A1 | 6/2005 |
| DE | 10 2005 051 049 A1 | 5/2006 |

(Continued)

OTHER PUBLICATIONS

International Search Report (PCT/ISA/210) issued in PCT Application No. PCT/EP2018/054128 dated Jun. 18, 2018 with English translation (seven (7) pages).

(Continued)

*Primary Examiner* — Omeed Alizada
(74) *Attorney, Agent, or Firm* — Crowell & Moring LLP

(57) ABSTRACT

A motor vehicle including a lighting module that generates a set of symbols on the ground in the surroundings of the motor vehicle and a control device that controls the operation of the lighting module. The control device is designed such that it predicts the movement of a road user present in the surroundings of the motor vehicle based on information relating to the road user, and that it automatically adapts the set of symbols depending on the predicted movement of the road user.

18 Claims, 1 Drawing Sheet

(56) References Cited

U.S. PATENT DOCUMENTS

| | | |
|---|---|---|
| 2013/0054089 A1 | 2/2013 | Nordbruch et al. |
| 2014/0062685 A1 | 3/2014 | Tamatsu et al. |
| 2015/0336502 A1 | 11/2015 | Hillis et al. |
| 2016/0059771 A1 | 3/2016 | Meinzer et al. |
| 2016/0167648 A1 | 6/2016 | James et al. |
| 2017/0140651 A1* | 5/2017 | Lee ........................ B60Q 1/525 |
| 2017/0253177 A1* | 9/2017 | Kawamata ............. B60Q 9/008 |
| 2017/0268896 A1* | 9/2017 | Bai .................... G01C 21/3697 |
| 2018/0118099 A1* | 5/2018 | Kunii ..................... G03B 29/00 |

FOREIGN PATENT DOCUMENTS

| | | |
|---|---|---|
| DE | 10 2009 009 473 A1 | 8/2010 |
| DE | 10 2011 081 394 B3 | 10/2012 |
| DE | 10 2011 119 923 A1 | 5/2013 |
| DE | 10 2013 217 057 A1 | 3/2014 |
| DE | 10 2013 211 877 A1 | 1/2015 |
| DE | 10 2013 214 481 A1 | 1/2015 |
| DE | 10 2014 000 935 A1 | 7/2015 |
| DE | 10 2014 226 254 A1 | 6/2016 |
| DE | 10 2015 201 766 A1 | 8/2016 |
| DE | 10 2016 122 043 A1 | 6/2017 |
| JP | 2014-13524 A | 1/2014 |

OTHER PUBLICATIONS

German-language Written Opinion (PCT/ISA/237) issued in PCT Application No. PCT/EP2018/054128 dated Jun. 18, 2018 (six (6) pages).

German-language Search Report issued in counterpart German Application No. 10 2017 203 899.3 dated Nov. 8, 2017 with partial English translation (11 pages).

European Office Action issued in European Application No. 18 708 069.2 dated Feb. 25, 2021 (five (5) pages).

* cited by examiner

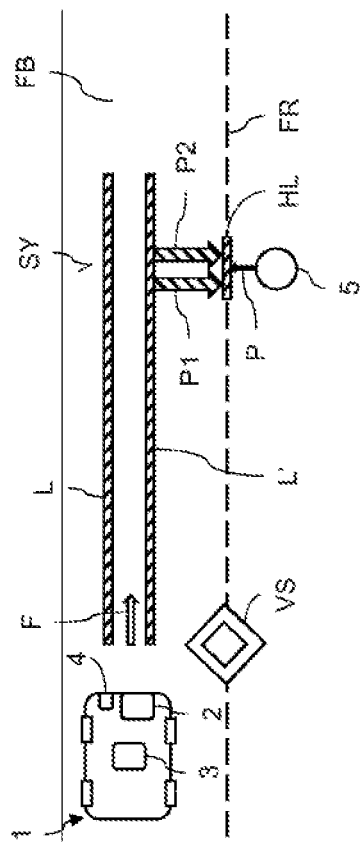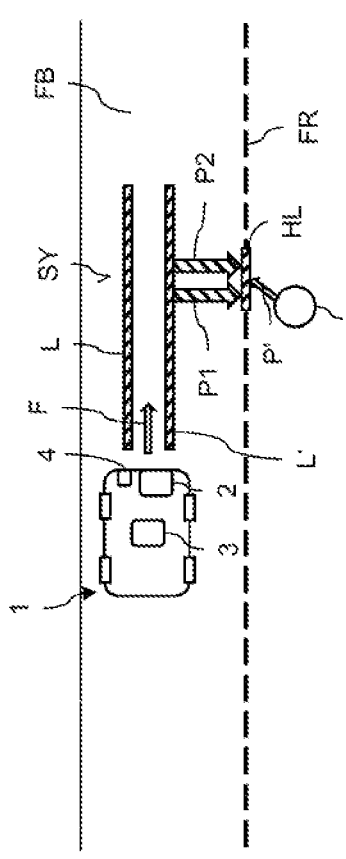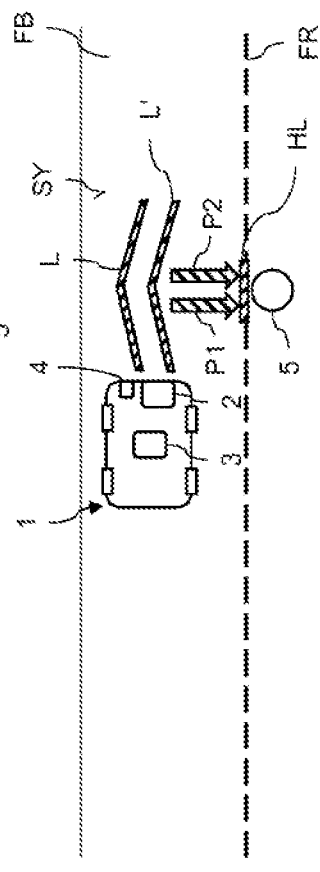

MOTOR VEHICLE COMPRISING A LIGHTING MODULE FOR GENERATING A SET OF SYMBOLS

CROSS REFERENCE TO RELATED APPLICATIONS

This application is a continuation of PCT International Application No. PCT/EP2018/054128, filed Feb. 20, 2018, which claims priority under 35 U.S.C. § 119 from German Patent Application No. 10 2017 203 899.3, filed Mar. 9, 2017, the entire disclosures of which are herein expressly incorporated by reference.

BACKGROUND AND SUMMARY OF THE INVENTION

The invention relates to a motor vehicle with a lighting module for generating a set of symbols.

From the prior art, lighting modules for motor vehicles are known, with which symbols are displayed on the ground in the vicinity of the motor vehicle. For example, document DE 10 2013 21 1 877 A1 discloses a motor vehicle with a projection module consisting of an array of projection lenses. With this projection module a light distribution in the form of a light carpet is generated in the vicinity of the motor vehicle and, in particular, near to the entry doors. In this system, static images are generated that do not refer to a current traffic situation.

The object of the invention is to create a motor vehicle with a lighting module for generating a set of symbols on the ground in the vicinity of the motor vehicle, wherein the set of symbols is dynamically adapted to the current traffic situation.

This object is achieved by the motor vehicle according to patent claim 1. Extensions of the invention are defined in the dependent claims.

The motor vehicle according to the invention, which can be either a manually controlled or an autonomously or partially autonomously driving vehicle, comprises a lighting module for generating a set of symbols on the ground in the immediate vicinity of the motor vehicle. Preferably, the lighting module is a projection module, which projects the symbols onto the ground in the vicinity of the motor vehicle. In addition, the motor vehicle according to the invention contains a control device for controlling the operation of the lighting module, wherein the control device may also form part of the lighting module. The control device is designed in such a way that it predicts the movement of a road user present in the surroundings of the motor vehicle on the basis of information relating to said road user, and that it adapts the set of symbols automatically depending on the predicted movement of the road user.

If applicable, the motor vehicle according to the invention can also comprise a plurality of the illumination modules described above with a correspondingly assigned control device.

The motor vehicle according to the invention has the advantage that the set of symbols generated by the motor vehicle is modified with a corresponding movement prediction at an early stage, allowing appropriate information, in particular for the driver of the motor vehicle and/or other road users, to be generated.

The set of symbols can be designed according to the invention in any desired form and can contain different symbols and, in particular, also letters and numbers. Preferably, the set of symbols is chosen in such a way that they intuitively communicate a warning signal. The notion of modification of the set of symbols is to be understood in a broad sense. In particular, the modification of the set of symbols can also include changing only a part of the set of symbols. Depending on the design, various parameters of the set of symbols can be varied as part of their modification. In particular, the size of the symbols, the orientation of the symbols (i.e. their direction along the ground), the position of the symbols, the shape of the symbols, the brightness of the symbols, the color of the symbols and the like can be modified. As mentioned earlier, these parameters can also be modified in only some parts of the set of symbols.

The above term "road user" covers any type of vehicles participating in road traffic, in particular other motor vehicles, i.e., cars, trucks, motorcycles and the like, and even non-powered vehicles, such as bicycles. In addition, the term "road user" also includes pedestrians. Wherever reference is made in the following to the perception of the set of symbols by a road user, in the case of a vehicle this should be understood to mean perception by a person who is present in or on the vehicle.

The information relating to the road user in the vicinity of the motor vehicle, which is processed by the control device, can come from different sources. In a preferred embodiment the motor vehicle comprises an environment sensor, in particular a camera and/or a lidar device and/or a radar device, in order to capture the information about the road user, at least partly, and provide it to the control device.

Alternatively or additionally, the motor vehicle can also comprise a communication interface and, in particular, a wireless communication interface, in order to receive, at least partly, the information about the road user with this communication interface and to provide it to the control device. This communication interface is preferably a car-to-car and/or car-to-X communication interface. Via such interfaces, information is exchanged between vehicles and/or between vehicles and infrastructure equipment. For example, the motor vehicle according to the invention can access sensor information that was determined by another vehicle.

In a particularly preferred embodiment the control device of the motor vehicle according to the invention is configured in such a way that at least a part of the set of symbols is generated depending on the predicted movement of the road user at a location on the ground at which the road user will be located in the future in accordance with its predicted movement, and at which a danger of collision with the vehicle exists in the event of continued movement of the road user. In this way, a timely warning can be generated for the road user and possibly also other road users including, in particular, the driver of the motor vehicle.

In a preferred variant of the embodiment just described, the road user is moving next to the road surface on which the motor vehicle is driving, wherein the control device is designed in such a way that at least a part of the set of symbols is generated at the location where the road user will enter the road surface in accordance with its predicted movement. In this case, the road user is preferably a pedestrian or cyclist.

In a further preferred variant the set of symbols comprises a stop line, which represents the latest position by which the road user should stop. This intuitively indicates the location of the collision danger. This stop line may be supplemented by additional symbols to reinforce its visibility, such as arrows which point to the stop line.

In another preferred embodiment of the motor vehicle according to the invention, the generated set of symbols is designed such that it communicates to the road user a reference to the motor vehicle. In this way, the road user can quickly identify the vehicle from which the symbols originate. In a preferred variant, the set of symbols comprises a plurality of lines, which converge in the direction towards the motor vehicle.

In a further design of the motor vehicle according to the invention the control device is designed in such a way that it adapts the set of symbols to an intended movement of the motor vehicle. In the case of an autonomously driven motor vehicle, the information about the intended movement of the motor vehicle can be read out from its control unit. In the case of a partially-autonomously driven motor vehicle or a manually controlled motor vehicle, this information can be determined, for example, from a driver assistance system which in the event of impending danger temporarily assumes control of the motor vehicle. In addition, information from the navigation system of the motor vehicle, in particular the current navigation route, may also be used to determine the intended movement.

In a preferred variant of the embodiment just described, the control device is designed in such a way that an intended avoidance maneuver of the motor vehicle to avoid a collision with the road user is displayed by means of the set of symbols, wherein the intended avoidance maneuver is preferably represented by one or more lines on the ground.

Depending on the design, the lighting module can be fitted in the motor vehicle according to the invention in different ways. In particular, the lighting module can be arranged in the motor vehicle in such a way that it generates the set of symbols in front of the motor vehicle in the direction of travel. It is equally possible that the lighting module generates the set of symbols behind the motor vehicle in the direction of travel. If appropriate, the lighting module can also be installed in the motor vehicle in such a way that the set of symbols is generated next to the vehicle at the side.

The lighting module in the motor vehicle according to the invention can be designed in different ways. As already mentioned above, it is preferably a projection module. To ensure a long range of the lighting module, it comprises a laser light source, the light of which is used to ensure that the set of symbols is generated on the ground. It is equally possible that the lighting module is a scanning lighting device, which generates the symbols on the ground via a scanning motion of a light spot. With the scanning lighting module the position, orientation and shape of the symbols can easily be changed.

An exemplary embodiment of the invention is described in detail in the following, with reference to the attached figures.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 a schematic plan view of a first scenario in which a set of symbols is generated with an embodiment of the motor vehicle according to the invention.

FIG. 2 and FIG. 3 are schematic plan views of a second scenario in which a set of symbols is generated using an embodiment of the motor vehicle according to the invention.

DETAILED DESCRIPTION OF THE DRAWINGS

FIG. 1 shows a plan view of a motor vehicle 1 according to the invention, which comprises a lighting module 2 in order to project a set of symbols on the ground in front of the motor vehicle with this module. The motor vehicle also comprises a control device 3, with which the set of symbols generated by the lighting module is modified. In addition, the motor vehicle contains an environment sensor 4, which is designed, for example, as a camera and detects objects in front of the motor vehicle 1. The information collected with the environment sensors 4 is processed by the control device 3, in order to use it to detect other road users and to predict their movement based on this information. Appropriate methods for movement prediction are already known and will therefore not be explained further here. Depending on the predicted movement, the set of symbols projected on the ground is then modified, as will be explained in more detail in the following.

In the scenario of FIG. 1 the motor vehicle 1 is travelling in the forward direction indicated by the arrow F. The motor vehicle is located on a road surface FB, wherein the right-hand edge of the road surface FR is reproduced by a dashed line. The road is a major road, as is indicated by the right-of-way sign VS. In the scenario of FIG. 1 a schematically implied pedestrian 5 is moving towards the right-hand edge of the road FR. The movement shown takes place in the direction perpendicular to the edge of the road FR, as indicated by the arrow P. The environment sensor 4 of the motor vehicle 1 detects the road user 5 and its movement pattern. This information is supplied to the control device 3. In the case shown in FIG. 1 the control device 3 detects that the pedestrian 5 is moving towards the right-hand edge of the road FR and will continue to move perpendicular to it in accordance with the detected movement pattern. As a consequence, as a warning to the pedestrian 5 the set of symbols SY shown in FIG. 1 is generated on the ground in front of the motor vehicle 1.

The set of symbols SY comprises, on the one hand, the two straight lines L and L', which in the embodiment described here correspond to the intended movement of the motor vehicle. In the scenario of FIG. 1 the lines L and L' therefore show that the motor vehicle continues to travel on the road in a straight line. In the case of an autonomously driven vehicle this information is stored in the motor vehicle. Should the vehicle be a manually controlled or partially autonomously driven vehicle, this information can come from various information sources, such as from driver assistance systems or from the navigation system of the motor vehicle. In the simplest case, it is detected via the navigation system that the vehicle is driving on a straight road, from which it will be concluded in the absence of further evidence that the motor vehicle will continue to move along this road in a straight line.

In addition to the lines, the set of symbols SY includes a stop line HL, at which two arrows P1 and P2, which extend perpendicularly between the line L' and the stop line HL, additionally terminate. The subregion of the symbols formed from the arrows P1, P2 and the stop line HL in the embodiment described here is projected on the ground in front of the motor vehicle depending on the predicted movement of the pedestrian 5, such that the stop line HL indicates where the pedestrian 5 should stop according to its predicted movement in order to avoid a collision with the motor vehicle 1. In other words, the stop line HL, together with the arrows P1 and P2, is projected on the ground at the place where the pedestrian 5 will enter the roadway FB. The stop line HL is therefore located on the right-hand edge of the road FR.

If the predicted movement profile of the pedestrian 5 is not changed, the subregion containing the symbols consisting of the arrows P1, P2 and the stop line HL remains fixed at the location shown in FIG. 1, even if the distance between the motor vehicle 1 and the pedestrian 5 decreases. In other words, the absolute position of this subregion of the symbols is maintained, whereas the relative distance between this subregion and the motor vehicle is reduced. Due to the fact that the generated subregion of the set of symbols is defined depending on the predicted movement of the pedestrian, this can be used to generate an early warning for the pedestrian.

FIG. 2 and FIG. 3 show a plan view of a scenario which is similar to the scenario of FIG. 1. The same reference numerals are therefore used for the same components. The scenario of FIG. 2 and FIG. 3 differs from FIG. 1 in that the pedestrian 5 is no longer moving perpendicular to the edge of the road FR, but at an angle to it. By analogy to FIG. 1, the movement of the pedestrian 5 is again detected by the environment sensor 4 and from this movement, it is predicted by the control device 3 that the pedestrian is moving in accordance with the arrow P' at an angle to the edge of the road. As a result, the subregion of the set of symbols SY, consisting of the arrows P1, P2 and the stop line HL, is now projected further to the right than in the scenario of FIG. 1, since the pedestrian will reach the edge of the road FR at a point further to the right. Since in the scenario of FIG. 2 there is no direct risk of collision, the intended movement of the motor vehicle is still straight ahead, which is indicated by the straight lines L and L' of the projected symbols SY.

FIG. 3 shows the same scenario as FIG. 2, but at a later point in time when the pedestrian 5 has now almost reached the right-hand edge of the road FR. The subregion of the set of symbols consisting of arrows P1, P2 and stop line HL has the same position as shown in FIG. 2. Due to the now real danger of collision between motor vehicle 1 and pedestrian 5, a driver assistance system of the motor vehicle 1 intends to automatically perform an avoidance maneuver towards the left-hand edge of the road. This information is processed by the control device 3, which then indicates the planned avoidance maneuver by appropriately bending the lines L and L' on the ground of the motor vehicle. In this way, the pedestrian 5 and also the driver of the motor vehicle 1 are again separately warned about an imminent collision and an associated avoidance maneuver.

The embodiments of the invention described in the foregoing have a number of advantages. In particular, for the first time, the prediction of the movement of a road user in the vicinity of a motor vehicle is used to adapt the symbols generated by the motor vehicle to the predicted movement. In this way, the road user and/or the driver of the motor vehicle can be warned of impending collisions in good time. In a preferred variant there is also a facility by which the intended movement by the motor vehicle is reflected by the set of symbols generated on the ground.

LIST OF REFERENCE NUMERALS 1 motor vehicle
2 lighting module
3 control device
4 environment sensor
5 pedestrian
SY set of symbols
VS traffic sign
F direction of travel of the motor vehicle
P1, P2 arrows of the set of symbols
HL stop line of the set of symbols
L, L' lines of the set of symbols
FB road surface
FR right-hand edge of road
P, P' predicted movement of the pedestrian The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle comprising:
   a light source configured to generate a set of symbols on the ground in a vicinity of the motor vehicle; and
   a control device configured to control operation of the light source, wherein the control device is configured to predict a movement of a road user present in surroundings of the motor vehicle based on information relating to the road user, and to automatically adapt the set of symbols depending on a predicted movement of the road user;
   wherein the set of symbols includes a stop line for the road user, a pair of straight parallel lines, and a pair of straight parallel arrows extending from the pair of straight parallel lines to the stop line.

2. The motor vehicle according to claim 1, further comprising an environment sensor, including at least one of a camera, a lidar device, and a radar device, to capture, at least partly, the information relating to the road user and to provide the information to the control device.

3. The motor vehicle according to claim 1, further comprising a wireless communication interface configured to receive, at least partly, the information relating to the road user and to provide the information to the control device, wherein the wireless communication interface comprises at least one of a car-to-car interface and car-to-X communication interface.

4. The motor vehicle according to claim 1, wherein the control device is configured such that at least a part of the set of symbols is generated depending on the predicted movement of the road user at a location on the ground at which the road user will be located at a future time based on the predicted movement, and at which a danger of collision with the vehicle exists if the road user continues the predicted movement.

5. The motor vehicle according to claim 4, wherein the control device is configured such that, when the road user is moving next to a road surface on which the motor vehicle is driving, at least a part of the set of symbols is generated at a location where the road user will enter the road surface based on the predicted movement.

6. The motor vehicle according to claim 4, wherein the location of the collision danger is indicated to the road user by the stop line.

7. The motor vehicle according to claim 1, wherein the set of symbols communicates to the road user a reference to the motor vehicle.

8. The motor vehicle according to claim 7, wherein the set of symbols comprises a plurality of lines which converge in a direction of the motor vehicle.

9. The motor vehicle according to claim 1, wherein the control device is configured to adapt the set of symbols to an intended movement of the motor vehicle.

10. The motor vehicle according to claim 9, wherein the control device is configured such that an intended avoidance maneuver of the motor vehicle to avoid a collision with the road user is displayed by the set of symbols, wherein the intended avoidance maneuver is represented by one or more lines on the ground.

11. The motor vehicle according to claim 1, wherein the light source is installed in the motor vehicle such that the lighting module generates the set of symbols in front of the motor vehicle in a direction of travel or behind the motor vehicle in the direction of travel.

12. The motor vehicle according to claim 2, further comprising a wireless communication interface configured to receive, at least partly, the information relating to the road user and to provide the information to the control device, wherein the wireless communication interface comprises at least one of a car-to-car interface and car-to-X communication interface.

13. The motor vehicle according to claim 2, wherein the control device is configured such that at least a part of the set of symbols is generated depending on the predicted movement of the road user at a location on the ground at which the road user will be located at a future time based on the predicted movement, and at which a danger of collision with the vehicle exists if the road user continues the predicted movement.

14. The motor vehicle according to claim 2, wherein the set of symbols communicates to the road user a reference to the motor vehicle.

15. The motor vehicle according to claim 2, wherein the control device is configured to adapt the set of symbols to an intended movement of the motor vehicle.

16. The motor vehicle according to claim 3, wherein the control device is configured to adapt the set of symbols to an intended movement of the motor vehicle.

17. The motor vehicle according to claim 2, wherein the light source is installed in the motor vehicle such that the lighting module generates the set of symbols in front of the motor vehicle in a direction of travel or behind the motor vehicle in the direction of travel.

18. The motor vehicle according to claim 2, wherein the light source comprises at least one of a laser light source, a light of which is used to generate the set of symbols on the ground, and a scanning module which generates the set of symbols via a scanning motion of a light spot on the ground.

\* \* \* \* \*